United States Patent
Long et al.

(10) Patent No.: US 7,058,152 B2
(45) Date of Patent: *Jun. 6, 2006

(54) METHOD AND APPARATUS FOR TIMING RECOVERY IN ADSL TRANSCEIVERS UNDER A TCM-ISDN CROSSTALK ENVIRONMENT

(75) Inventors: Guozhu Long, Newark, CA (US); Chin N Hung, San Jose, CA (US); Yaron Bar-Ness, San Jose, CA (US)

(73) Assignee: Centillium Communications, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/827,800

(22) Filed: Apr. 19, 2004

(65) Prior Publication Data

US 2004/0196938 A1 Oct. 7, 2004

Related U.S. Application Data

(63) Continuation of application No. 09/515,415, filed on Feb. 29, 2000, now Pat. No. 6,724,849.

(51) Int. Cl.
*H04L 25/10* (2006.01)
*H04L 25/49* (2006.01)

(52) U.S. Cl. ..................... 375/371; 371/294
(58) Field of Classification Search ............... 375/371, 375/222, 354, 355, 362, 373, 294
See application file for complete search history.

(56) References Cited

U.S. PATENT DOCUMENTS 5,732,113 A 3/1998 Schmidl et al.
6,122,246 A 9/2000 Marchok et al.
6,134,283 A 10/2000 Sands et al.
6,252,908 B1 6/2001 Tore
6,310,926 B1 * 10/2001 Tore ........................... 375/355
6,351,500 B1 * 2/2002 Kumar ....................... 375/270
6,389,087 B1 5/2002 Heinonen et al.
6,546,056 B1 * 4/2003 Rosenlof ..................... 375/260
6,724,849 B1 * 4/2004 Long et al. ................. 375/371
6,765,957 B1 * 7/2004 Palm .......................... 375/222
6,771,590 B1 * 8/2004 Marchok et al. ............ 370/207

OTHER PUBLICATIONS

Digital Transmission System Metallic Local Lines for ISDN Basic Rate Access, ITU- T.G. 961, Mar. 1993, pp. 1-134.
Draft New Recommendation G.992.2-Splitterless Asymmetrical Digital Subscriber Line (ADSL) Transceivers-For Approval, ITU, COM 15-136-E, Mar. 1999.
Draft New Recommendation G.992.1: Asymmetrical Digital Subscriber Line (ADSL) Transceivers-Approved, ITU, G.992.1 Editor Final Version, Jul. 1999.

* cited by examiner

*Primary Examiner*—Khai Tran
(74) *Attorney, Agent, or Firm*—Fenwick & West LLP

(57) ABSTRACT

A system used to synchronize the clock frequency of a receiver with that of a transmitter, where both the receiver and transmitter communicate using the ADSL Annex C standard. The transmitter continuously transmits pilot tones to the receiver. The receiver determines the phase error between sequential pilot tone symbols to determine a phase error. The receiver uses the phase error to adjust the receiver clock frequency. However, if the most recently received symbol is subject to near end crosstalk or is subject to far end crosstalk and is a boundary symbol, the receiver ignores the phase error and does not adjust the receiver clock frequency.

5 Claims, 8 Drawing Sheets

METHOD AND APPARATUS FOR TIMING RECOVERY IN ADSL TRANSCEIVERS UNDER A TCM-ISDN CROSSTALK ENVIRONMENT

CROSS REFERENCE TO RELATED APPLICATIONS

This application is a continuation of U.S. application Ser. No. 09/515,415, filed Feb. 29, 2000, now U.S. Pat. No. 6,724,849, which is incorporated by reference in its entirety.

BACKGROUND

1. Field of the Invention

The present invention relates generally to digital subscriber line transceivers for communicating using telephone subscriber loops, and more particularly, to techniques for performing clock frequency synchronization (timing recovery) for asymmetric digital subscriber line transceivers under TCM-ISDN crosstalk.

2. Background of the Invention

FIG. 1 depicts in a block diagram a relationship between a single transmitter 102 (central office (CO)) and single receiver 104 (customer premises equipment (CPE)) that use digital subscriber line (DSL) communications over copper telephone wires 106. The wider bandwidth needed for DSL transmission generates crosstalk interference among copper wire pairs bundled in the same cable binder. The level of crosstalk varies for different cable structures and materials. Some countries such as Japan and Korea use telephone cables with a paper-based "pulp" insulator rather than the plastic insulated cables (PIC) used in the United States. These pulp cables have high level of crosstalk between different services over copper wires bundled in the same cable binder. ISDN service has been deployed widely over copper wires. Crosstalk caused by ISDN service is one of the major interferences to other newly deployed DSL services since portions of the transmission band for ISDN service overlap with portions of the transmission band for DSL services.

In countries such as Japan, where the noisy pulp cables are installed, a special TCM-ISDN system is deployed. This system is described in the International Telecommunication Union Telecommunication Standardization Sector (ITU-T) specification G.961, Appendix III. The G.961 Appendix III system reduces crosstalk interference by switch synchronizing ISDN cards at the central office using Time Compression Multiplexing (TCM). TCM provides for ISDN signal transmission and reception during different time periods to reduce near-end crosstalk between ISDN services.

ITU-T ADSL standards G.992.1 and G.992.2 Annex C (hereafter "ADSL Annex C") describe the operation of DSL modems under TCM-ISDN interference. Signal transmissions from DSL modems are switch synchronized to a 400 Hz TCM Timing Reference (TTR) generated at the central office. The TTR signal is the master clock signal for determining when the central office modem (the "CO 102 modem") and the customer premises equipment (the "CPE 104 modem") should transmit and receive ISDN and DSL signals.

Within the same cable binder, TCM generates a time varying noise environment. During the first half period of the TTR signal, the CO modem is dominated by near end crosstalk (NEXT) interference, and roughly speaking, during the second half period the CO modem is dominated by far end crosstalk (FEXT) interference. The reverse is true for the CPE 104 modem. FIG. 2 is a diagram illustrating the relationship between TTR, ISDN, and G.992.2 timing.

The TCM-ISDN crosstalk environment can be different depending on the length of the subscriber loop. On long subscriber loops, because the received signal is heavily attenuated, the NEXT interference is large compared to the received signal. The channel capacity in the NEXT period can be greatly reduced, sometimes be zero. On the other hand, in the FEXT period, the channel typically has good signal-to-noise ratio (SNR) because the FEXT interference is much weaker than NEXT, and small relative to the received signal.

FIG. 3 illustrates the relationship between the TTR signal, the ISDN NEXT/FEXT interference, and ADSL Annex C transmit frames. A "Sliding Window" operation specified in G.992.1 and G.992.2 Annex C defines the procedure for transmitting symbols under ISDN interference synchronized to the TTR signal. The $FEXT_R$ symbols are symbols completely inside the $FEXT_R$ period. The $NEXT_R$ symbols are symbols inside any portion of the $NEXT_R$ period. Thus, there are more $NEXT_R$ symbols than $FEXT_R$ symbols, as shown in FIG. 3. The CO modem 102 decides if a particular symbol is a $FEXT_R$ symbol or $NEXT_R$ symbol according to the sliding window and transmits the symbol according to bit maps corresponding to $FEXT_R$ and $NEXT_R$ symbols. Similarly, the CPE 104 modem decides if a particular symbol is a $FEXT_C$ symbol or $NEXT_C$ symbol and transmits the symbol according to bit maps corresponding to $FEXT_C$ and $NEXT_C$ symbols. The bit map for NEXT symbols can be all zero. In that case, only one bit map is used in each direction for FEXT symbols only. Although the exact symbol time is sliding relative to the TTR signal, the pattern is fixed by ADSL Annex C to be periodic with the period 345 symbols long, which is hereafter referred to as a "hyperframe."

Referring to FIG. 4, there is shown the 345 training symbols that make up a hyperframe, and its relationship to the TTR signal including the mapping of $NEXT_R/FEXT_R$ symbols. The only significant difference between the $NEXT_R$ and $FEXT_R$ symbols is the additive TCM-ISDN interference. Any symbol that is partially affected by NEXT interference is treated as NEXT symbol. The FEXT symbols represent a signal treated as transmitted entirely during the FEXT period. The remaining training symbols are treated as though they were transmitted during the NEXT period. From FIG. 4, it is observed that the TTR signal and the CO modem symbols are not aligned. However, over a period of 345 symbols, the TTR signal spans 32 or 34 periods, depending on the cyclic prefix selected by the CO modem. This least common multiple period is used by ADSL Annex C to define the hyperframe.

ADSL Annex C specifies a Discrete Multi-tone (DMT) system, which includes a plurality of tones having different carrier frequencies, each of which is modulated with different data. Tone 64 is used to transmit a "pilot tone" which enables synchronization of the clocks of the CO and CPE modems. The pilot tone is transmitted by the CO modem 102 (master) and synchronized to by the clock of the CPE modem 104 (slave). Using a conventional pilot tracking technique, the CPE modem checks the received pilot signal continuously to control the CPE modem clock. However, under the TCM-ISDN interference environment, use of a pilot tone transmitted during both NEXT and FEXT periods can lead to inaccurate synchronization of the clocks of the CO and CPE 104 modems because the pilot signal during NEXT period may be badly corrupted by the TCM-ISDN NEXT.

What is needed is a method and apparatus that improves the synchronization of the clocks of the CO and CPE under TCM-ISDN crosstalk.

SUMMARY OF THE INVENTION

One embodiment of the present invention includes an apparatus used to perform timing recovery, namely, synchronize the frequency of the receiver clock with a reference clock of a remote transmitter. For example, in this embodiment, the frequency of the reference clock or a representation thereof is transmitted to the receiver. When this embodiment is used in an environment such as ADSL, near end crosstalk periodically disrupts the integrity of the reference signal. In this embodiment, a computer implemented method is provided that includes the following acts. First, receiving a first pilot tone symbol from the transmitter. Second, receiving a second pilot tone symbol from the transmitter later. Third, determining a phase error between the first and second pilot tone symbols. Fourth, selectively setting the phase error to zero based on the crosstalk environment of the second pilot tone symbol. The TCM-ISDN crosstalk environment is predictable and periodic. Fifth, adjusting the frequency of the receiver clock based on the phase error. In this embodiment, the act of setting the phase error to zero occurs if the crosstalk is near end type. By setting phase error to zero, clock adjustment is skipped. Alternatively, in this embodiment, the act of setting the phase error to zero occurs if the crosstalk is far end type, the receiver is in early training mode, and the pilot tone symbol is a boundary symbol adjacent to a NEXT symbol.

One embodiment of the present invention includes an apparatus that determines a phase error to use to synchronize a receiver clock frequency with that of a transmitter, where the system includes: a transmitter that transmits at least one pilot tone and a training mode indicator to the receiver; a sample clock that generates a sample clock signal; a symbol identifier that receives the sample clock signal and that indicates a symbol index associated with the most recent symbol; a phase error measurer device that measures the phase error between the two pilot tone symbols and outputs the phase error; and a phase error determination device ("PEDD") that receives the phase error from the phase error measurer device, the symbol index from the symbol identifier and the training mode indicator from the transmitter, wherein the PEDD determines whether to ignore the phase error based on the symbol index and the training mode indicator. In this embodiment, the PEDD determines the crosstalk environment of the most recent symbol by using the symbol index and ignores the phase error if the crosstalk is near end type. In one embodiment, the PEDD determines the crosstalk environment of the most recent symbol by using the symbol index, determines whether the most recent symbol is a FEXT boundary symbol and ignores the phase error if the crosstalk is far end type, the training mode indicator signals early training mode, and it is a boundary symbol, namely the FEXT symbol adjacent to a NEXT symbol.

Advantageously, the above described embodiments use pilot tone symbols transmitted in tolerably noisy environment to synchronize the receiver clock with the transmitter clock; this embodiment avoids using signals transmitted in an intolerably noisy environment.

DETAILED DESCRIPTION OF THE PREFERRED EMBODIMENTS

In one embodiment of the present invention, the CPE 104 is modified to determine which pilot tone symbols, from the CO 102, to use to synchronize the clock 105 of the CPE 104 with clock 103 of the CO 102. One advantage of this embodiment is more accurate matching of the frequency of the clock signals of the CPE 104 and CO 102. However, a trade off is that the clock signals of the CO 102 and the CPE 104 are matched at a slower rate.

Figure 5:
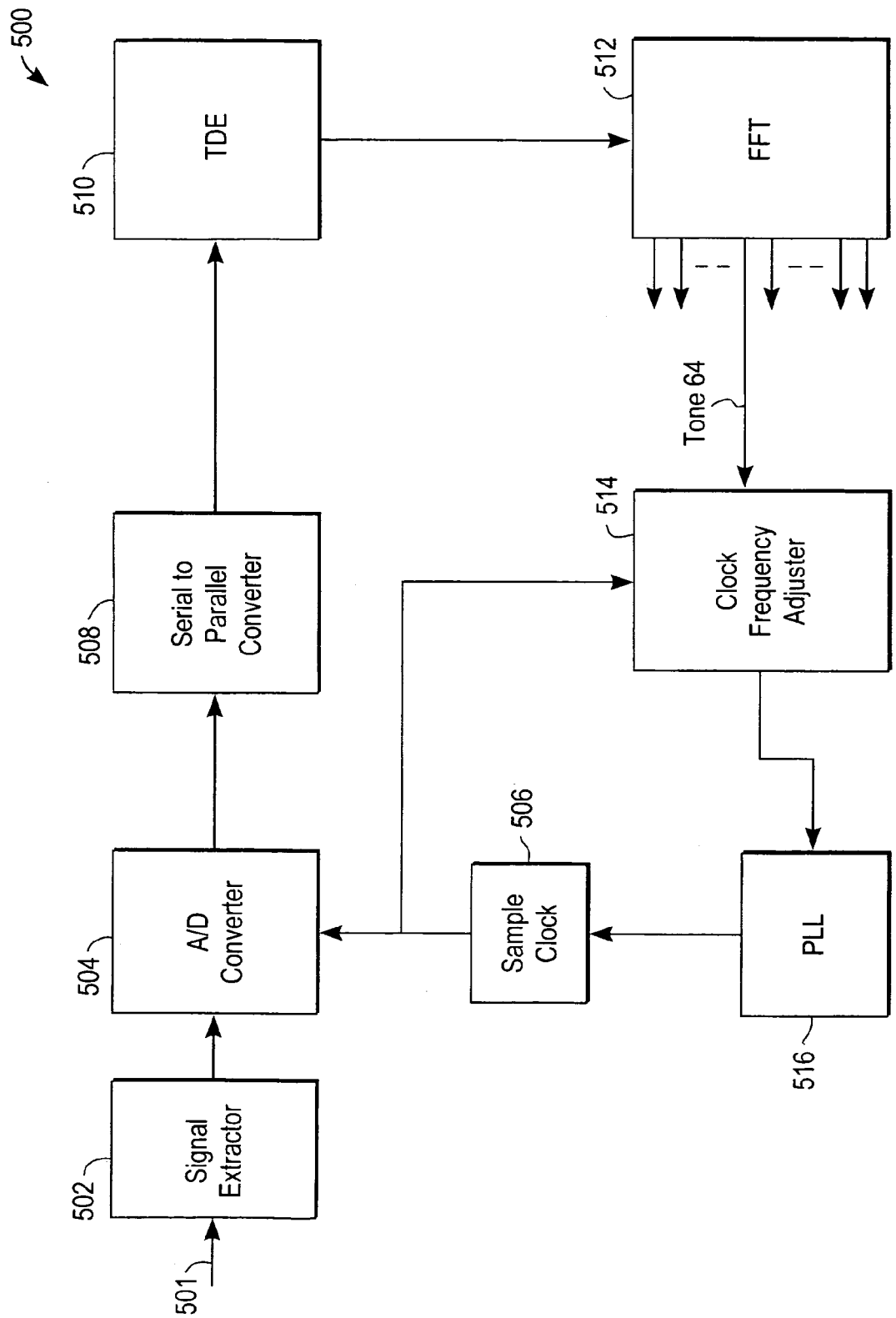
FIG. 5 provides a block diagram of a suitable implementation of a CPE 104 in accordance with an embodiment of the present invention.

FIG. 5 provides a block diagram of a suitable implementation of a CPE 104 in CPE 500 that is in accordance with an embodiment of the present invention. Each component of the CPE 500 may be implemented in software, hardware, or firmware. Where any part of the CPE 500 is implemented in software, a suitable microprocessor, input/output device, and memory are used to execute the software.

The CPE 500 includes a conventional signal extractor 502, conventional A/D converter 504, a conventional sample clock 506, a conventional serial-to-parallel converter 508, a conventional linear time domain equalizer (TDE) 510, a conventional fast Fourier transformer (FFT) 512, a clock frequency adjuster 514, which is in accordance with an embodiment of the present invention and described in more detail below, and a conventional phase locked loop (PLL) 516.

Figure 1:
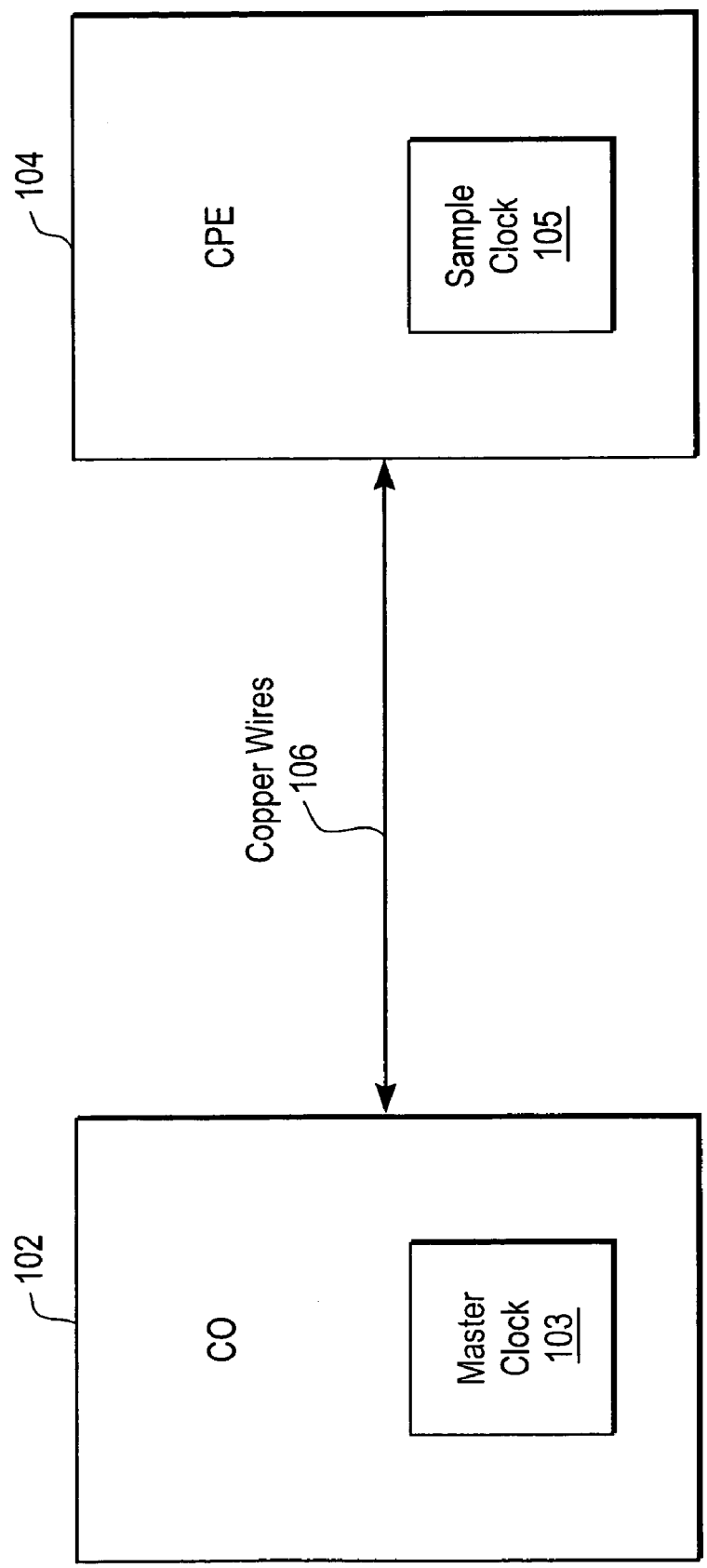
FIG. 1 depicts in a block diagram a relationship between a single transmitter and single receiver that communicate using the asymmetric digital subscriber line (ADSL) standard over copper telephone wires.
Figure 2:
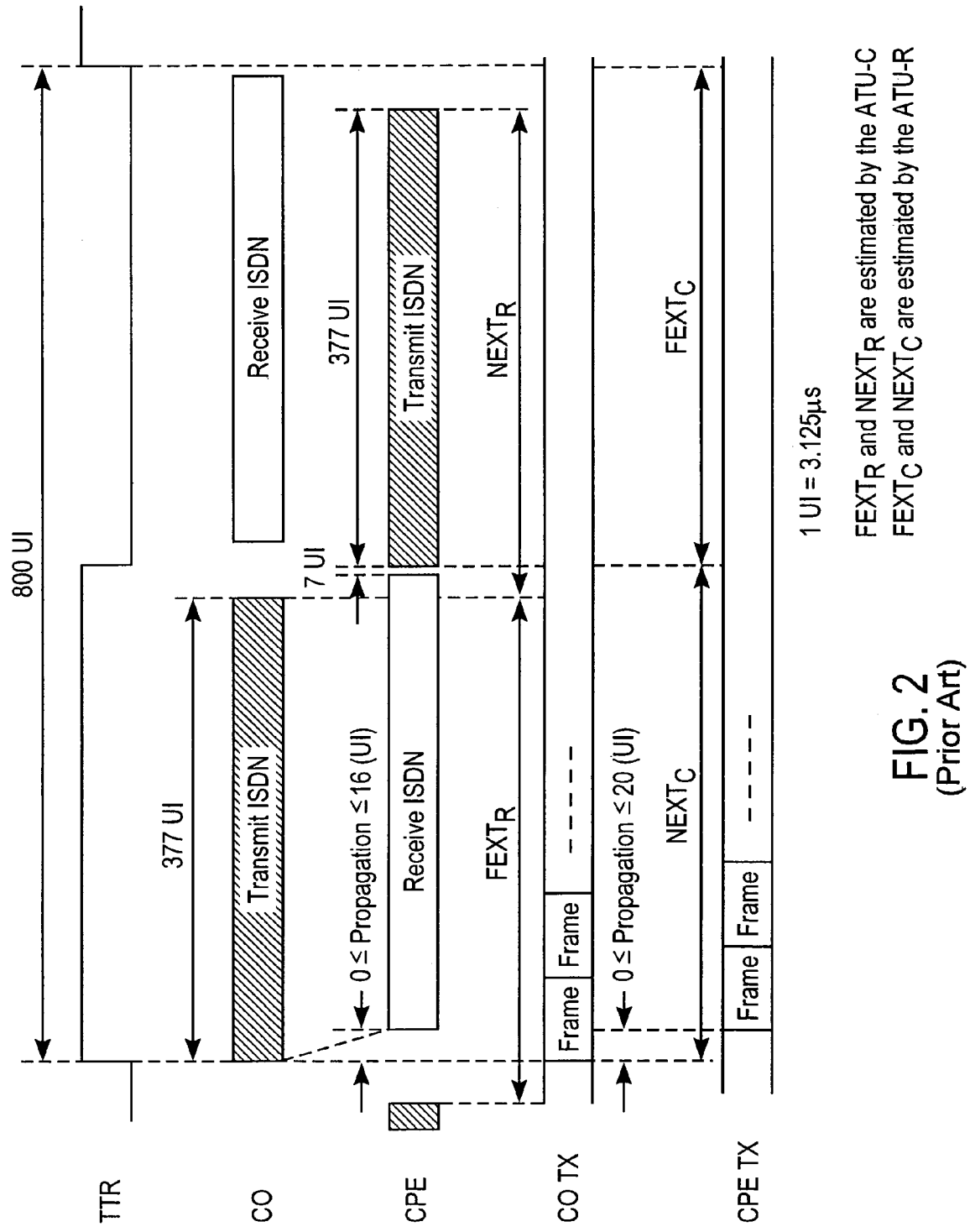
FIG. 2 is a diagram illustrating the relationship between TTR, ISDN, and ADSL Annex C timing signals.
Figure 3:
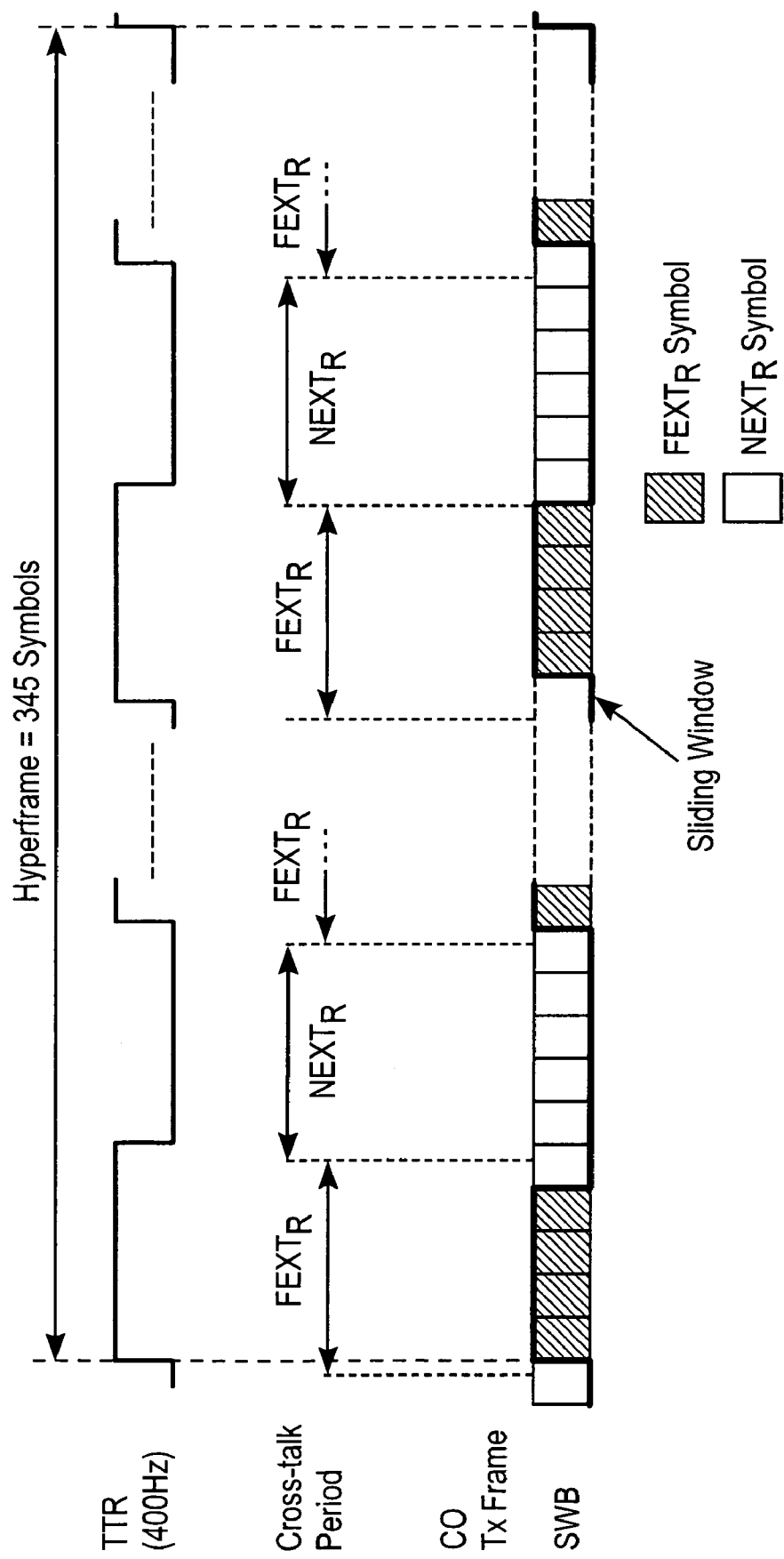
FIG. 3 illustrates the relationship between the TTR signal, the ISDN NEXT/FEXT interference, and ADSL Annex C transmit frames.

Signal extractor 502 performs 2-to-4-wire conversion, which converts the bi-directional two-wire signal 501 transmitted using the copper wire line 106 (FIG. 1) into two pairs of one-directional transmissions. One pair is for receiving and the other pair is for transmitting. Additionally, the signal extractor 502 can include a splitter that filters-out signals from the bi-directional two-wire signal 501 that are not included in a typical DSL transmission band. For example, the low frequency POTS signal is blocked by the splitter so that it will not interfere with high frequency ADSL signal, as is well known in the art.

The conventional A/D converter 504 receives an analog signal from the signal extractor 502 and outputs a digital rendition to a conventional serial-to-parallel converter 508. A conventional sample clock 506 sets the sample frequency of the A/D converter 504. The conventional serial-to-parallel converter 508 converts the serial bit stream from the A/D converter 504 into a stream of digital samples and outputs the stream of samples to the time domain equalizer (TDE) 510.

The conventional TDE 510 is, for example, a finite impulse response (FIR) filter that compensates for the channel distortion (e.g., frequency response and phase distortion over a telephone line) in the time domain. For a description of a suitable implementation of the time domain equalizer 510, see U.S. patent application Ser. No. 09/514,976 filed Feb. 29, 2000 and entitled "Equalizer Training For ADSL Transceivers Under TCM-ISDN Crosstalk Environment," which is incorporated herein by reference in its entirety. The time domain equalizer 510 outputs digital samples to a FFT 512.

The conventional FFT 512 converts the digital samples from time domain equalizer 510 to the frequency domain and separates all of the sub-channels. One of the sub-channels is a pilot tone that is transmitted on tone 64 in accordance with G.992.1 and G.992.2. The pilot tone is provided to the clock frequency adjuster 514.

The clock frequency adjuster 514, in accordance with one embodiment of the present invention, outputs a phase error that controls the frequency of the sample clock 506. A suitable process of the clock frequency adjuster 514 is described below and with respect to process 700.

The conventional PLL 516 receives a phase error from the clock frequency adjuster 514 and adjusts the clock frequency of the sample clock 506 based on the phase error.

Clock Frequency Adjuster 514

Figure 6:
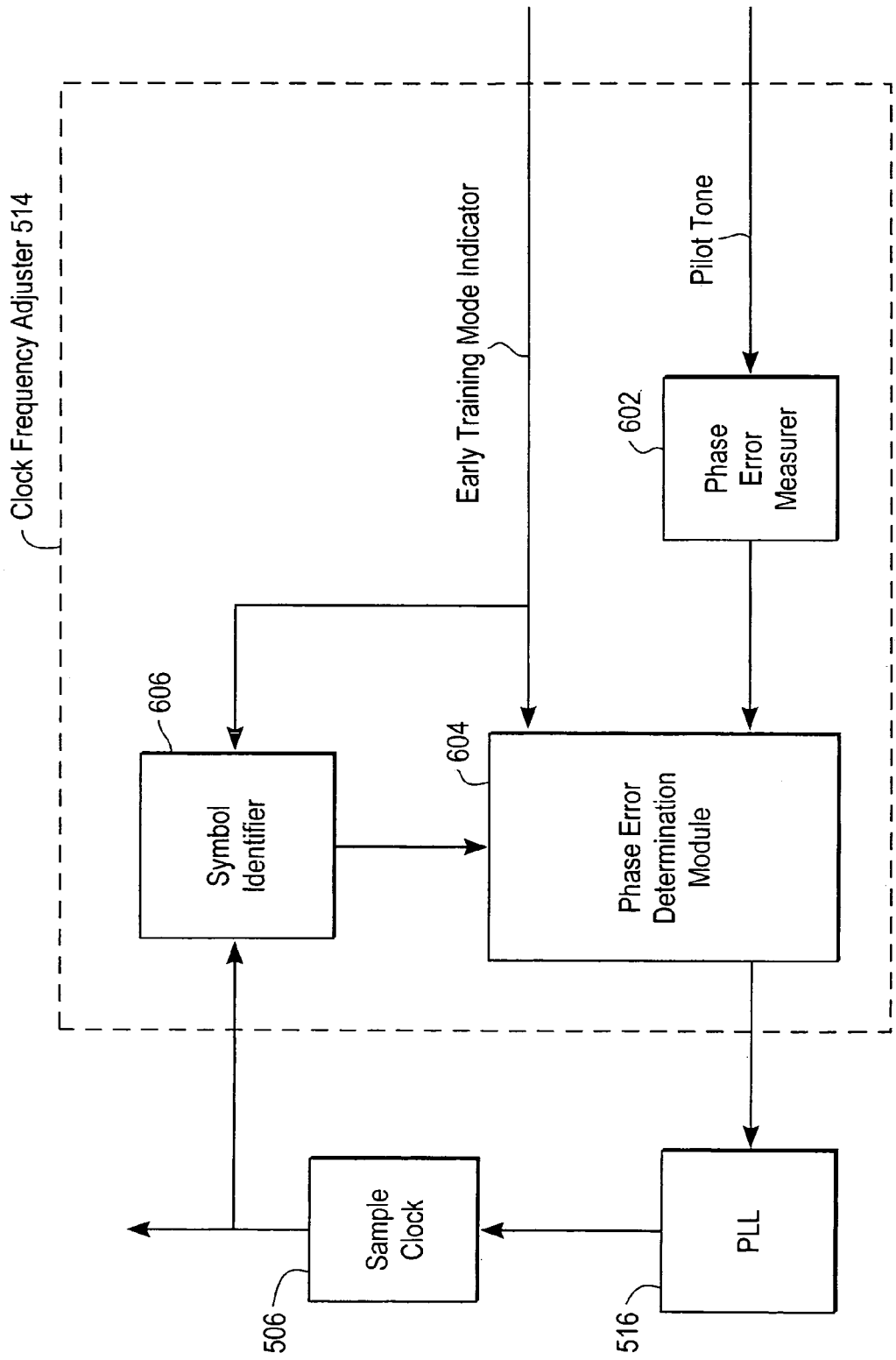
FIG. 6 depicts in block diagram form a suitable embodiment of the operation of the clock frequency adjuster of CPE.

FIG. 6 depicts in block diagram form a suitable embodiment of the operation of the clock frequency adjuster 514 of CPE 500. This embodiment of the clock frequency adjuster 514 is implemented in software that is executed by a microprocessor, or the clock frequency adjuster 514 can be implemented as hardware or firmware.

The clock frequency adjuster 514 includes a conventional phase error measurer module 602, a phase error determination module 604, and a conventional symbol identifier module 606. The phase error measurer module 602 provides a phase error to the phase error determination module 604. The symbol identifier module 606 receives the sample clock signal from the sample clock 506 of FIG. 5 and provides a symbol index to the phase error determination module 604. The phase error determination module 604 determines whether to signal the PLL 516 of FIG. 5 to adjust the frequency of the sample clock 506 to match the clock signal of the clock 103 of the CO 102.

The conventional phase error measurer module 602 receives the pilot tone from the FFT 512 (FIG. 5), which is computed once every symbol. The phase error measurer module 602 measures the phase error between current and a previously received pilot tone symbols.

In one embodiment, the pilot tone is represented using quadrature amplitude modulation (QAM) as a complex number (i.e., real and imaginary components). Thereby the pilot tone represents a vector when plotted on an X-Y plane. When the receiver clock is not synchronized to the remote transmitter clock, this pilot vector will rotate from symbol to symbol. The phase error measurer module 602 provides the difference (error) in phase between pilot tone symbols ("phase error") to the phase error determination module 604. The pilot tone symbols may or may not be sequential to each other.

Figure 4:
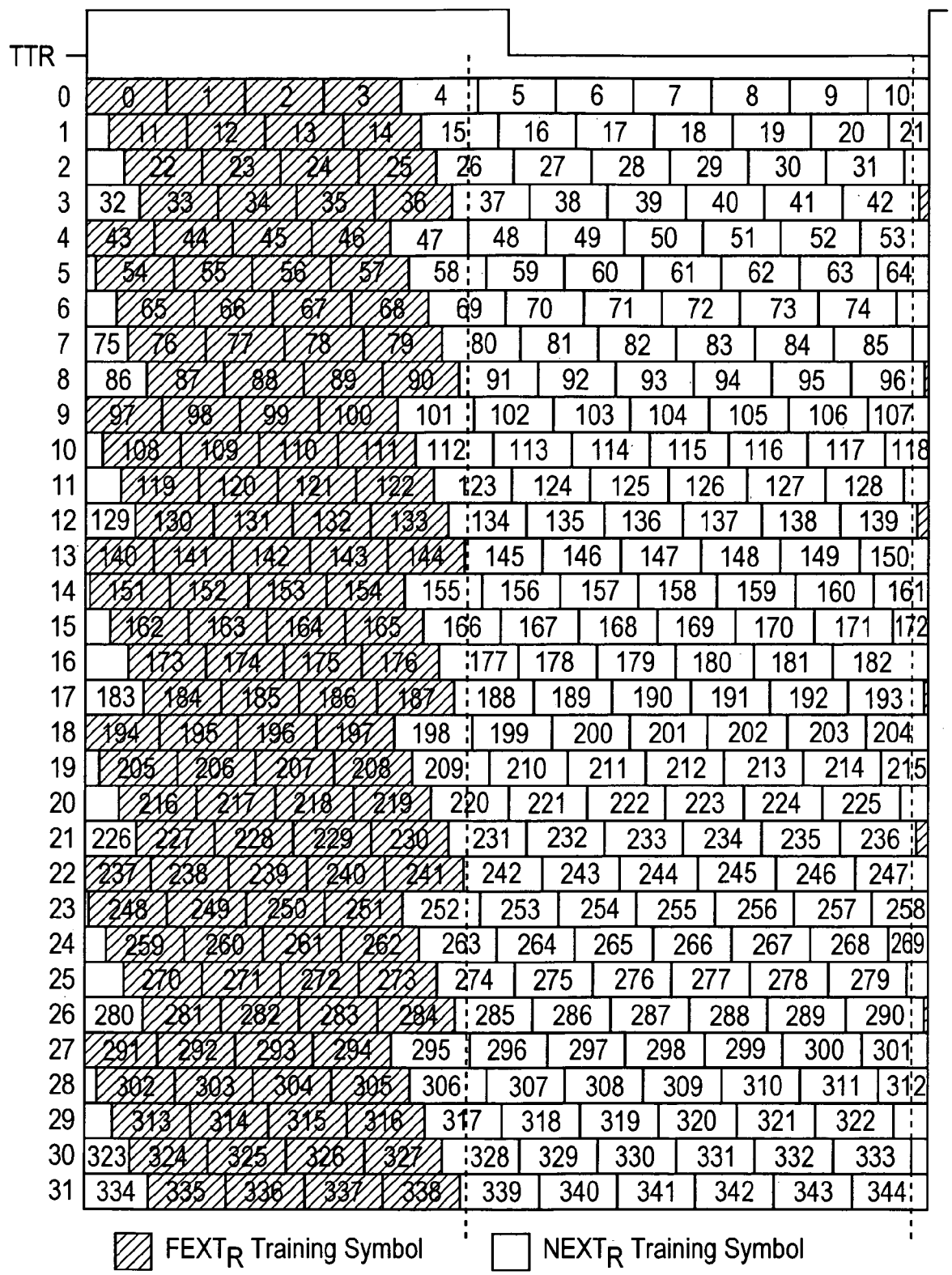
FIG. 4 shows 345 training symbols that make up a hyperframe, and its relationship to the TTR signal as well as mapping of NEXT/FEXT symbols.

The symbol identifier module 606 determines a symbol index, i.e., the symbol number transmitted in relation to the 345 symbols transmitted in a hyperframe (FIG. 4), associated with the most recently received symbol. In this embodiment, the symbol identifier module 606 first divides the frequency of the sample clock signal by 256 for G.992.2 or 512 for G.992.1 if the CPE 500 is in early training mode (where cyclic prefix is not added) and otherwise divides the sample clock signal frequency by 272 for G.992.2 or 544 for G.992.1 for later training mode ("divided sample clock signal"). G.992.1 and G.992.2 specify that after the C-SEGUE-1 signal, a cyclic prefix is used. Use of cyclic prefix corresponds to later training mode.

Next, the symbol identifier module 606 determines the symbol index by, for example, following each period of the divided sample clock signal, incrementing the symbol index by 1 or decreasing the symbol index by 345 if the symbol index is greater than 344. The symbol index is initially set to zero (0). The symbol identifier module 606 sends the symbol index to the phase error determination module 604.

Figure 7:
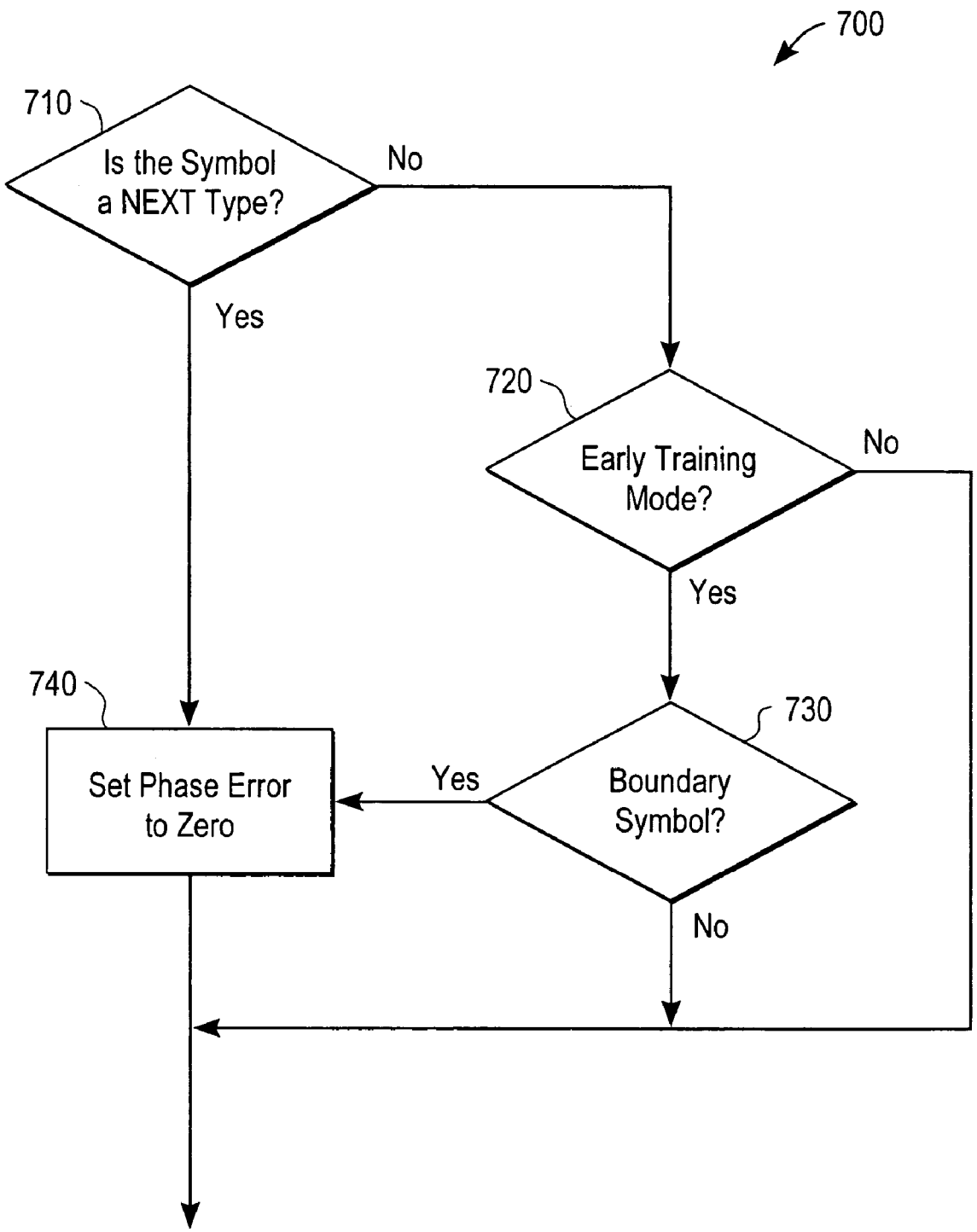
FIG. 7 depicts a suitable process 700 executed by the phase error determination module.

The phase error determination module 604 receives the phase error from the phase error measurer module 602, the symbol index from the symbol identifier module 606, and the early training mode indicator from the CPE modem 500 after it detects the end of C-SEGUE1 in a manner well known in the art. The phase error determination module 604 determines the phase error to apply to the PLL 516 of CPE 500 of FIG. 5. A suitable process 700 executed by the phase error determination module 604 is described with respect to FIG. 7.

Process 700

Process 700 decides whether the phase error computed by the phase error measurer 602 is reset to 0. If it is not reset, the phase error computed by phase error measurer 602 shall be used by PLL 516 to adjust the clock. In action 710 of process 700, the phase error determination module 604 determines the crosstalk type, i.e., NEXT or FEXT. In this embodiment, the phase error determination module 604 determines the crosstalk type by using the symbol index and training mode (i.e., early or later). The G. 992.2 Annex C specifies the following formulas to determine the crosstalk type:

For early training mode (no cyclic prefix),

---

$S=256*N_{dmt}$ mod 2760
    if { (S+255 < a) or (S > a+b) } then FEXT symbol
    else NEXT symbol
where
    $N_{dmt}$ is the current symbol index,
    a=1243, and
    b=1461

---

(see C.5.2.2 of G.992.2). For later training mode (with cyclic prefix),

---

$S=272*N_{dmt}$ mod 2760
    if { (S+271 < a) or (S > a+b) } then FEXT symbol
    else NEXT symbol
where
    $N_{dmt}$ is the current symbol index,
    a=1243, and
    b=1461

---

(see C.8.1 of G.992.2). For G.992.1, similar formulas can be found in G.992.1 Annex C.

In action 720, the phase error determination module 604 determines whether the CPE 500 is in early training mode.

If the CPE 500 is in early training mode, action 730 follows, otherwise for late training mode, process 700 ends.

Figure 8:
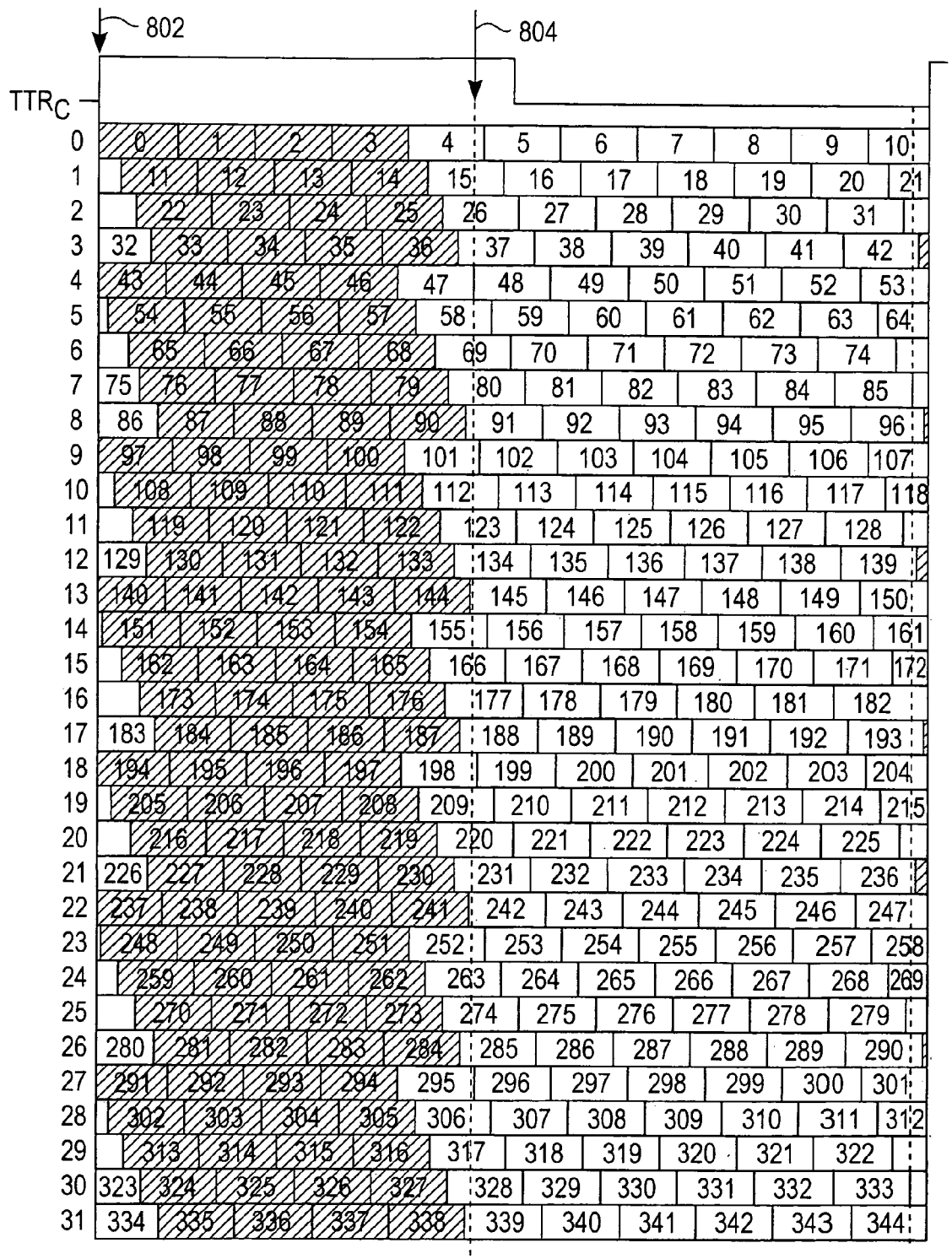
FIG. 8 specifies which symbols are boundary symbols in early training mode.

In action 730, the phase error determination module 604 determines whether the symbol index is a "boundary symbol" as defined in G.992.1 and G.992.2 Annex C. For example, FIG. C-11 in G.992.2 specifies which symbols are boundary symbols in early training mode. FIG. 8 replicates the FIG. C-11. As shown in FIG. 8, there are two boundary symbols per row, where the boundary symbols are FEXT symbols adjacent to NEXT symbols. The following identifies the boundary symbols by symbol index: 0, 3, 11, 14, 22, 25, 33, 36, 43, 46, 54, 57, 65, 68, 76, 79, 87, 90, 97, 100, 108, 111, 119, 122, 130, 133, 140, 143, 151, 154, 162, 165, 173, 176, 184, 187, 194, 197, 205, 208, 216, 219, 227, 230, 237, 240, 248, 251, 259, 262, 270, 273, 281, 284, 291, 294, 302, 305, 313, 316, 324, 327, 335, and 338. G.992.1 Annex C specifies similar boundary symbol indices as does G.992.2 Annex C.

In one embodiment, the phase error determination module 604 uses a lookup table stored in a conventional memory to identify which symbols are boundary symbols. If the current symbol is a boundary symbol, then action 740 (FIG. 7) follows. Otherwise, the process 700 ends.

In action 740, the phase error is set to zero (0). The phase error determination module 604 ignores the phase error from the phase error measurer module 602 because the phase error was derived from a pilot tone symbol that was sent during a noisy NEXT period or the pilot tone is otherwise unusable because it was sent as a boundary symbol in early training mode. Boundary symbols are unusable in early training mode because inter-symbol interference is present in early training, thus the FEXT boundary symbols are affected by neighboring noisy NEXT symbols.

Thus after process 700 concludes, the phase error determination module 604 provides the phase error from the phase error measurer module 602 to the PLL 516, or provides zero phase error to the PLL 516. Advantageously, the phase error determination module 604 ignores any phase errors derived from low integrity symbols, i.e., symbols sent during a NEXT period or of a boundary FEXT symbol in early training mode.

MODIFICATIONS

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An apparatus that determines a phase error to use to synchronize a receiver clock frequency with that of a transmitter, the apparatus comprising:
    a transmitter that transmits at least one pilot tone symbol to the receiver;
    a sample clock that generates a sample clock signal;
    a symbol identifier coupled to receive the sample clock signal and that indicates a symbol index associated with the most recent symbol, the symbol index indicative of the crosstalk environment of the symbol;
    a phase error measurer device that measures the phase error between two pilot tone symbols and outputs the phase error; and
    a phase error determination device ("PEDD") coupled to receive the phase error from the phase error measurer device and the symbol index from the symbol identifier, wherein the PEDD determines whether to set the phase error to zero based on the crosstalk environment of the most recent symbol, wherein the PEDD adjusts the sample clock signal frequency using the phase error.

2. The apparatus of claim 1, wherein the PEDD determines the crosstalk environment of the most recent symbol by using the symbol index and sets the phase error to zero if the crosstalk environment is near end type.

3. The apparatus of claim 1, wherein the receiver and transmitter communicate in accordance with ADSL Annex C.

4. A computer system adapted for determining a phase error that is used to adjust a clock frequency, the system comprising:
    a module for recognizing at least one pilot tone symbol;
    a module for indicating a symbol index associated with the most recent symbol, the symbol index indicative of the crosstalk environment of the symbol;
    a module for measuring phase error between two pilot tone symbols and for outputting the phase error;
    a module for determining whether to set the phase error to zero based on the crosstalk environment of the most recent symbol; and
    a module for using the phase error to adjust the clock frequency.

5. The system of claim 4, wherein the module for determining determines the crosstalk environment of the most recent symbol by using the symbol index and sets the phase error to zero if the crosstalk environment is near end type.

* * * * *